United States Patent [19]
Gutekunst

[11] Patent Number: 4,574,771
[45] Date of Patent: Mar. 11, 1986

[54] COOKING GRILL

[75] Inventor: Peter Gutekunst, Buchen-Bödigheim, Fed. Rep. of Germany

[73] Assignee: Gutekunst Köchengeräte GmbH, Buchen-Bödigheim, Fed. Rep. of Germany

[21] Appl. No.: 486,923

[22] Filed: Apr. 20, 1983

[30] Foreign Application Priority Data

Apr. 21, 1982 [DE] Fed. Rep. of Germany ....... 3214684

[51] Int. Cl.⁴ .................... A47J 37/00; F24C 3/00
[52] U.S. Cl. .................... 126/41 R; 99/423; 99/349; 100/168
[58] Field of Search ............... 126/41 R, 41 A, 41 C, 126/41 B; 99/349, 423; 100/168; 219/244

[56] References Cited

U.S. PATENT DOCUMENTS 2,028,944 1/1936 Morrison .................... 126/41 C
2,243,492 5/1941 Wilson ........................ 99/373 X
3,401,626 9/1968 Amalfitano ................ 99/423 X
3,991,665 11/1976 Lang-Ree et al. ............ 99/441
4,072,092 2/1978 Köhli et al. ................... 99/349
4,211,909 7/1980 Yoshida et al. ............ 126/273 R X
4,357,171 11/1982 Nurse ........................... 100/168

FOREIGN PATENT DOCUMENTS 713355 9/1966 Italy ............................. 99/349

Primary Examiner—Larry Jones
Attorney, Agent, or Firm—Peter K. Kontler

[57] ABSTRACT

Steaks are grilled, one after the other, while advancing through a passage which is defined by three heated parallel rolls. A first roll is disposed at one side and the other two rolls are installed at the opposite side of the passage. The rolls are driven to advance the steaks downwardly into and through the passage. One of the other two rolls is adjustable at right angles to its axis so that the width of the entire passage can be adjusted.

13 Claims, 5 Drawing Figures

COOKING GRILL

BACKGROUND OF THE INVENTION

The invention relates to a cooking grill, particularly for grilling steaks, with a passage the vertically extending inlet section of which is disposed between two driven and heated parallel inlet rolls rotating at the same peripheral speed and conveying the food item downwards, the passage having a slightly inclined second section which extends between one of the inlet rolls and a third heated roll which latter is parallel to the inlet rolls and is driven to rotate counter to the direction of rotation of the one inlet roll and at the same peripheral speed.

In a grill which is disclosed in the German Utility Model No. 81 19 752, the width of the passage is chosen in such a way that a steak can travel through the passage at a slight contact pressure.

OBJECTS AND SUMMARY OF THE INVENTION

An object of the invention is to improve a grill of the type described above in such a manner that steaks of different sizes and/or thicknesses can travel through the passage with ease and are subjected to an optimal contact pressure.

The invention is characterized in that the one inlet roll which defines with the third roll the second section of the passage is mounted for movement in a direction at right angles to the axes of the rolls so as to simultaneously adjust the width of both sections of the passage.

Although one side of each food item to be grilled contacts two rolls one after another, whereas the other side of the item contacts a single roll, it is sufficient to adjust only that inlet roll which defines in part both sections of the passage in order to widen or narrow both sections of such passage. This contributes to simplicity of the adjustable grill.

The rolls are shielded in order to avoid accidents. This is achieved by the provision of a cover which defines an inlet opening above the inlet section of the passage. The width of the inlet opening is adjustable in synchronism and proportionally with adjustment of the width of the passage.

In order to clearly draw the operator's attention to the particular adjustment of the passage and to thus prevent the introduction of too large or too thin steaks not in conformity with the selected adjustment of the passage, there is preferably provided a device for adjusting the width of the passage as well as a device for adjusting the width of the inlet opening. The two adjusting devices are coupled to each other. Thus, the operator is able to ascertain the readily recognizable selected width of the opening, and in case it does not correspond with the thickness of the steak to be introduced for grilling, the operator will be able to adjust the width of the opening and with this also the width of the passage.

It is a further object of the invention to increase the speed of the steaks and, to this end, there is provided a microwave radiator the radiation of which is directed into the passage. The microwaves effect an additional heating of the steaks so that the total travelling time can be shortened. In contrast to the heating of the rolls, the microwaves also have a direct effect on the inner steak parts. By means of a corresponding dosage of the microwave influence, it is possible to grill the inner parts of the steaks to a desired extent at a constant speed of the steaks and unchanged heating of the rolls. Futhermore, and in contrast to the heating of the rolls, the intensity of the microwaves can be adjusted very quickly so that, with steaks travelling one after another, one can be finished intensively in its inner part, and another one which follows less intensively by adjusting the microwave radiation correspondingly. The intensity of the microwaves can also be adjusted very quickly to conform to the selected width of the passage and thereby to the thickness of the steaks travelling therethrough. This adjustment is preferably carried out automatically in dependency on the adjustment of the width of the passage.

DESCRIPTION OF THE PREFERRED EMBODIMENTS

Figure 1:
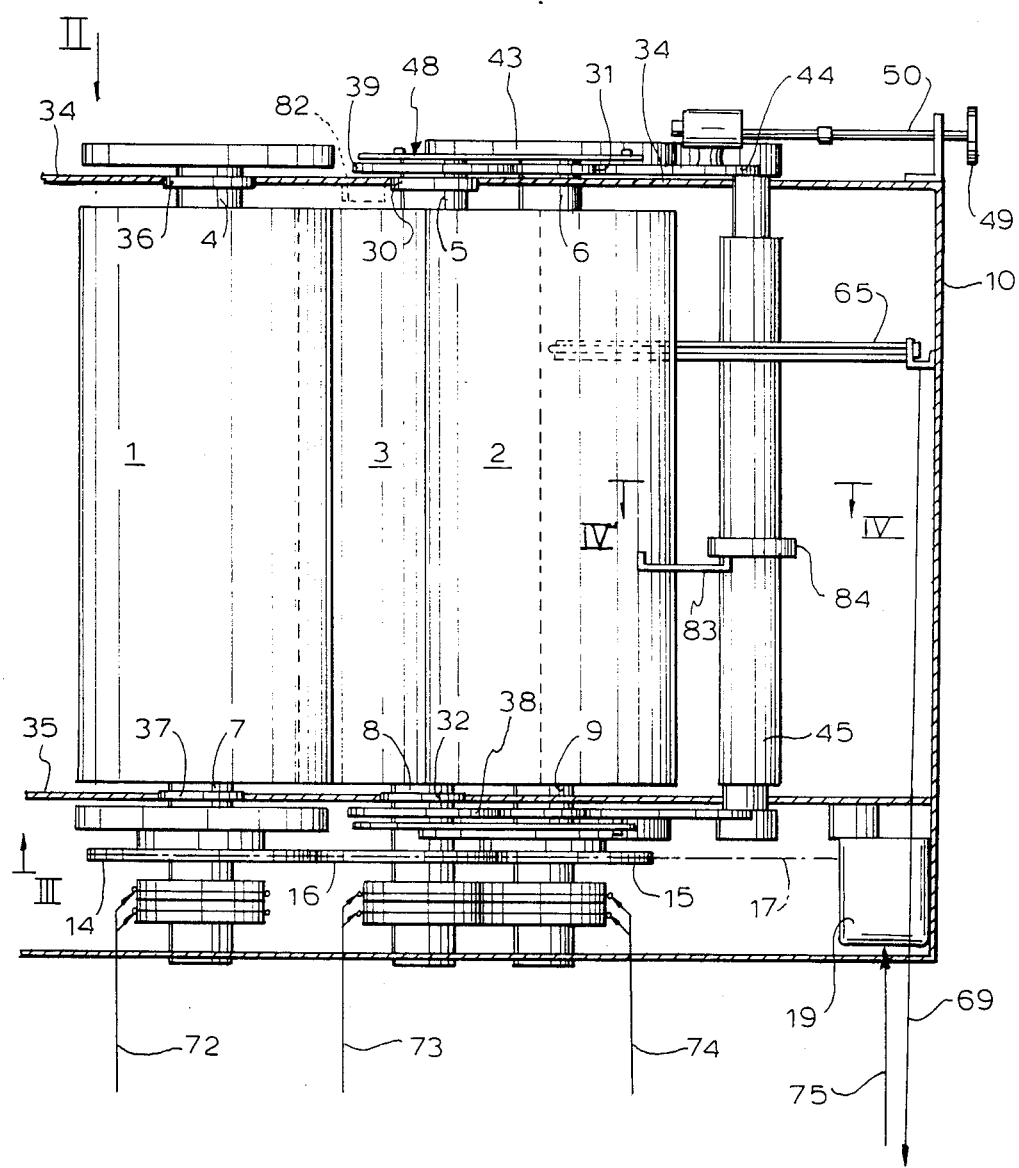
FIG. 1 is a horizontal sectional view of a grill which embodies one form of the invention.
Figure 2:
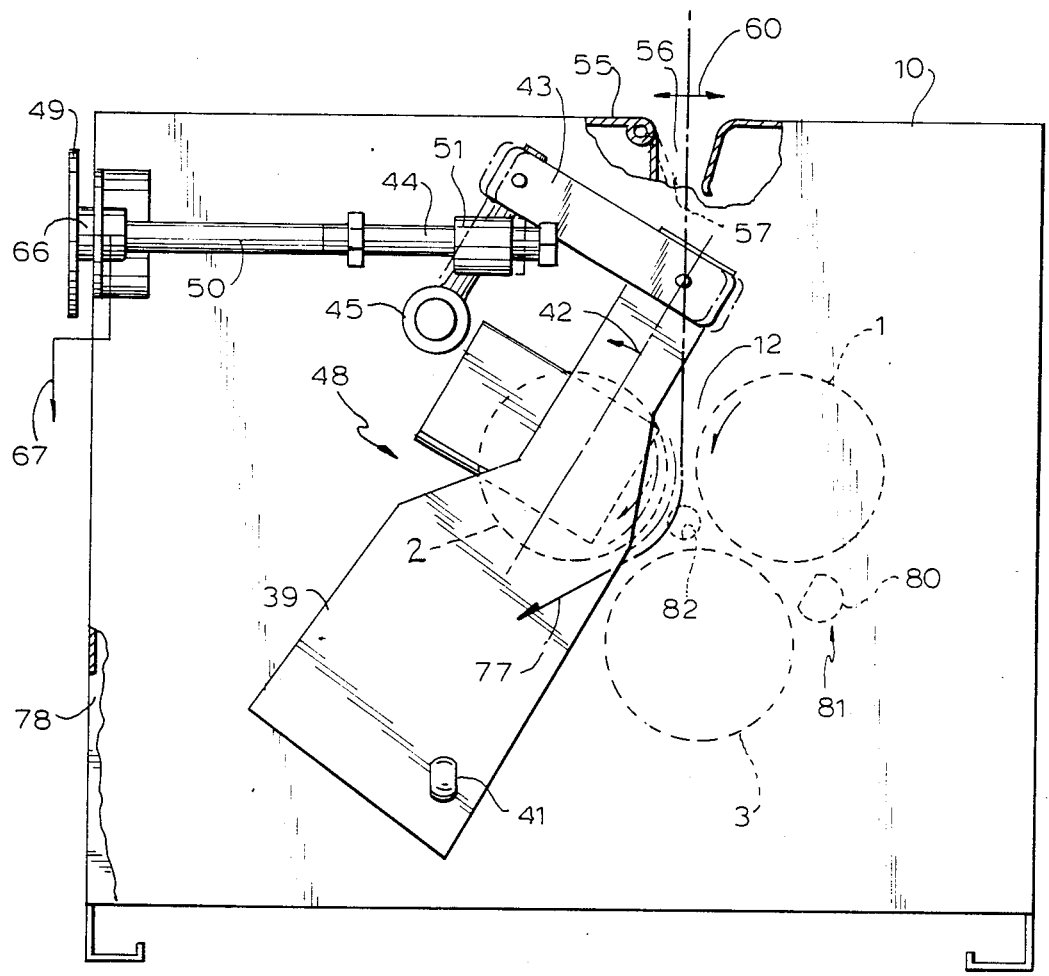
FIG. 2 is a side elevational view of the grill as seen in the direction of arrow II in FIG. 1, with certain parts omitted and with a portion of the housing broken away.
Figure 3:
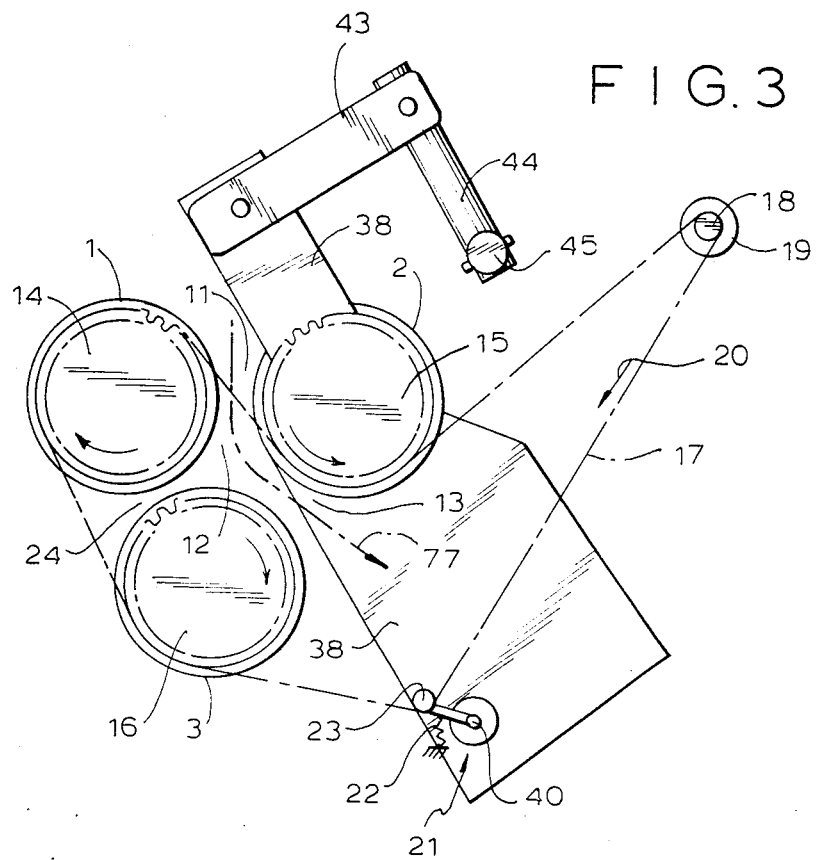
FIG. 3 is a fragmentary side elevational view as seen in the direction of arrow III is FIG. 1, with the housing and numerous other parts omitted.

FIGS. 1–3 show three heatable rolls 1, 2, 3 which are movably mounted in a housing 10 for rotation about horizontal axes, and their ends are respectively provided with stub shafts 4, 7; 5, 8 and 6, 9. The rolls 1 and 2, the so-called inlet rolls, define between themselves the vertical inlet section 11 of an essentially vertical passage 12. The rolls 1 and 3 define a further section 13 of the passage 12 and the section 13 is slightly inclined with reference to the vertical. The rolls 1, 2, 3 are driven by an endless chain 17 by means of attached sprocket wheels 14 to 16, the chain being driven in the direction of the arrow 20 by means of the driving sprocket wheel 18 of a motor 19. The chain 17 is tensioned by a chain fixture 21 which is equipped with a spring-biased tensioning wheel 23. The spring is shown at 22. The sprocket wheel 15 of the roll 2 engages the outer surface of the chain 17 while the sprocket wheels 14 and 16 of the two other rolls 1 and 3 engage the inner surface of the chain so that the rolls are driven in the directions of the arrows shown in FIG. 3 and determine the direction of advancement of items in the passsage 12. The peripheral speed of all rolls is the same because the rolls have identical diameters, the same as the pinions 14, 15, 16.

The narrowest portions of the inlet section 11 and second section 13 of the passage 12 have the same width. These sections can be widened simultaneously by adjusting the position of the roll 2. The gap 24 between the fixed rolls 1 and 3 is narrower than the minimum possible width of the passage 12.

While the bearings 30, 32 and 36, 37 for the rolls 3 and 1 are fixedly mounted in stationary bearing frames 34, 35 of the housing 10, the bearings 31 for the roll 2 are installed in one end each of pivotable arcuate bearing frames 38, 39. The other ends of the two arcuate bearing frames are installed in tumbler bearings 40, 41 which are mounted in the bearing frames 34, 35 for movement about an axis parallel to the axes of the rolls. When the bearing frames 38, 39 are moved in the direction of the arrow 42, the width of the inlet section 11 as well as of the second section 13 increases. When the bearing frames 38, 39 are moved in the opposite direction, the width of the sections 11 and 13 decreases. Several different positions of the roll 2 are indicated in FIG. 2 by phantom lines. The pivoting end of the bearing frame 39 is connected to a lever 43 which is connected to another lever 44, the latter being fastened to a shaft 45. The shaft 45 is parallel to the rolls 1 to 3 and is rotatably mounted in the bearing frames 34, 35. The bearing frame 38 is connected with levers which are mirror symmetrical to the levers 43, 44 and are fastened to the other end of the shaft 45. Accordingly, the shaft 45 rotates when the bearing frame 39 moves and causes the bearing frame 38 to perform an identical angular movement.

The adjusting device 48 including the bearing frame 39, the levers 43, 44 and the parts connected to the other end of the shaft 45 operates as a parallel motion for the roll 2 which thus remains parallel to the other rolls 1 and 3 in each of its positions.

A handle 49 which is accessible from the exterior of the housing 10 serves the purpose of operating and adjusting device 48. This handle can rotate a feed screw 50 which meshes with a nut 51. The nut 51 is non-rotatably attached to the lever 44 so that, when the handle 49 is rotated, the bearing frame 39 is pulled in the direction of arrow 42 or pushed in the opposite direction.

Figure 4:
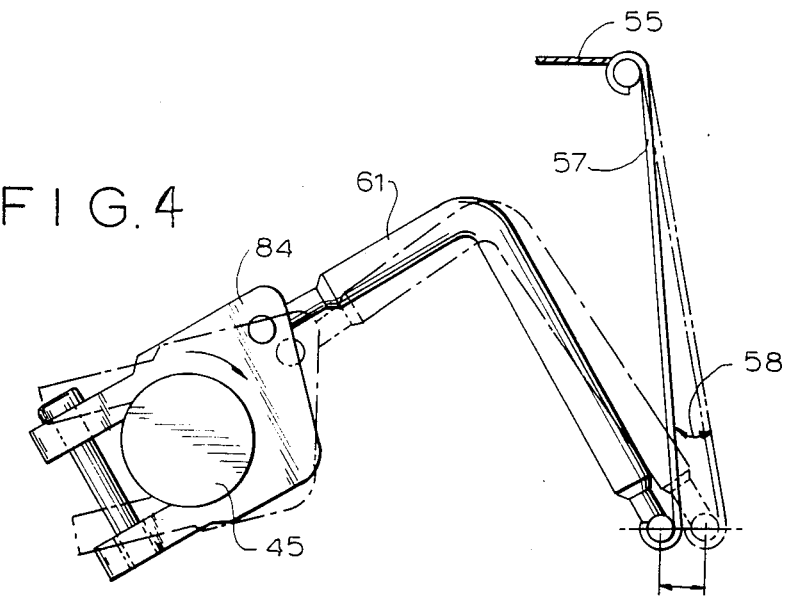
FIG. 4 is a fragmentary sectional view as seen in the direction of arrows from the line IV—IV of FIG. 1.

A wall of the housing 10 serves as a cover for the upward extension of the inlet section 11 and has an inlet opening 56 which extends along the full axial length of the rolls 1, 2 and 3. The character 57 designates a gate (see also FIG. 4) which is rotatable around an axis parallel to the rolls and by means of which the width of the inlet opening 56 can be adjusted as indicated by the double-arrow 60. The adjustment is always made in such a way that the width of the inlet opening 56 approximates the width of the passage 12. For this purpose, the gate 57 is attached by a coupling rod 61 to a strap 84 which is clamped to the shaft 45. This guarantees that, by actuating the adjusting device 48 to adjust the width of the passage 12, the gate 57 is adjusted at the same time within the range indicated by the arrow 58 to change the width of the inlet opening 56 so that this opening admits only steaks having a width such that the steaks can be treated with optimal contact pressure in the passage 12.

The rolls 1, 2, 3 are electrically heated by a heating devices which are mounted in the rolls, and the electrical conductors of the heating devices extend through the stub shafts 7, 8, 9 each of which constitutes a tube.

Figure 5:
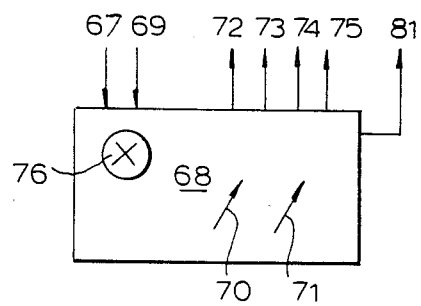
FIG. 5 is a diagrammatic view of a control unit which regulates the heating action in dependency on the selected width of the passage and the inlet opening.

The character 65 designates in FIG. 1 a thermo sensor which contacts the peripheral surface of the roll 3 and monitors the surface temperature of this roll. The character 66 designates a width sensor which, in response to adjustment of the handle 49, indicates as measured value the selected width of the passage 12. A signal denoting such measured value is transmitted to a central control unit 68 (see FIG. 5) by way of a conductor 67. The signal from the thermo sensor 65 reaches the control unit 68 through a conductor 69. Depending upon the intensity of signals transmitted by the conductors 67 and 69, according to a preselected program, and depending upon the adjustment of the knobs 70 and 71, the heating of rolls 1, 2, 3 is controlled by the control unit 68 via conductors 72, 73, 74, and the drive motor 19 is controlled via conductor 75.

The grill is operated in the following manner: At first, the rolls, 1, 2, 3 are pre-heated. The condition of readiness of the device for operation which is indicated by the indicator 76 of the control unit 68. Now the steaks can be introduced from the top through the inlet opening 56, and the size of the steaks depends on the particular adjustment of the width of the passage 12 and of the inlet opening 56. The steaks descend in and through the passage 12 in the direction of the arrow 77 and are grilled before they reach the outlet opening 78 of the housing 10 completely finished. If bigger, thicker, smaller or thinner steaks are to be grilled, the width of the inlet opening 56 and the width of the passage 12 are adjusted accordingly by manipulating the handle 49.

As a modification of or in addition to the aforedescribed embodiment, a microwave radiator 80 (shown by dotted lines in FIG. 2) is provided to direct radiation between the rolls 1 and 3 into the center of the passage 12 so that the radiation is distributed along the entire length of the rolls. The intensity of radiation which is emitted by the microwave radiator 80 can be adjusted by the control unit 68 via control conductor 81 depending upon the selected width of the passage 12 such as is signaled to the control unit 68 via conductor 69.

Instead of the microwave radiator 80 or in addition thereto, a microwave radiator 82 can be provided as shown by dotted lines in FIGS. 1 and 2. This radiator is installed in the axial extension of the center of and adjacent to the passage 12, and the radiation which issues therefrom is directed into the center of the passage in parallelism with the rolls, i.e., at right angles to the plane of FIG. 2. In this case, too, the intensity of the radiation can be adjusted by the control unit through a conductor corresponding to the control conductor 81. A further microwave radiator 83 can be mounted on the strap 84.

I claim:

1. A grill, particularly for grilling steaks, comprising two heated inlet rolls and a third heated roll, said rolls being parallel to one another and defining an elongated passage having a substantially vertical inlet section defined by said inlet rolls and a second section inclined with reference to said inlet section and defined by said third roll with one of said inlet rolls; means for driving said rolls at the same peripheral speed and in a direction to advance an item to be grilled frist through the inlet section and thereupon through the second section of said passsage, said driving means being arranged to rotate said inlet rolls in the opposite directions; means for moving said one inlet roll substantially at right angles to the axes of said rolls to thereby adjust the width of both sections of said passage; a cover disposed at a level above said inlet rolls and having an inlet opening for admission of items to be grilled into the inlet section of said passage; and means for adjusting the effective width of said inlet opening in synchronism with the adjustment of the width of said passsage.

2. The grill of claim 1, further comprising means for coupling said adjusting means to said moving means.

3. The grill of claim 1, wherein said driving means comprises sprocket wheels provided on said rolls, an endless chain trained over said sprocket wheels, and means for driving said chain.

4. The grill of claim 3, wherein the sprocket wheel of said one roll engages the exterior of said chain and the other two sprocket wheels engage the interior of said chain.

5. The grill of claim 1, further comprising means for heating the items in said passage independently of said rolls, including at least one microwave radiator arranged to direct radiation into said passage and control means for regulating the intensity of such radiation as a function of the selected width of said passage.

6. The grill of claim 5, wherein said passage includes a central portion and said radiator is arranged to direct radiation in parallelism with the axes of said rolls into the central portion of said passage.

7. The grill of claim 5, wherein the other of said inlet rolls and said third roll define a gap which communicates with said passsage and said radiator is arranged to direct radiation into said passage by way of said gap.

8. A grill, particularly for grilling steaks, comprising two heated inlet rolls and a third heated roll, said rolls being parallel to one another and defining an elongated passage having a substantially vertical inlet section defined by said inlet rolls and a second section inclined with reference to said inlet section and defined by said third roll with one of said inlet rolls, said rolls having coaxial stub shafts; means for driving said rolls at the same peripheral speed and in a direction to advance an item to be grilled first through the inlet section and thereupon through the second section of said passage, said driving means being arranged to rotate said inlet rolls in the opposite directions and including sprocket wheels mounted on the respective stub shafts, an endless chain trained over said sprocket wheels, means for driving said chain and means for tensioning said chain; and means for moving said one inlet roll substantially at right angles to the axes of said rolls to thereby adjust the width of both sections of said passage.

9. A grill, particularly for grilling steaks, comprising two heated inlet rolls and a third heated roll, said rolls being parallel to one another and defining an elongated passage having a substantially vertical inlet section defined by said inlet rolls and a second section inclined with reference to said inlet section and defined by said third roll with one of said inlet rolls, said one inlet roll having first and second end portions; means for driving said rolls at the same peripheral speed and in a direction to advance an item to be grilled first through the inlet section and thereupon through the second section of said passage, said driving means being arranged to rotate said inlet rolls in the opposite directions; and means for moving said one inlet roll substantially at right angles to the axes of said rolls to thereby adjust the width of both sections of said passsage, comprising first and second pivotable bearing frames having first ends rotatably supporting the respective end portions of said one inlet roll and second ends, and stationary additional bearing frames pivotally supporting the second ends of said first and second bearing frames for movement about an axis which is parallel to the axes of said rolls.

10. The grill of claim 9, further comprising a cover disposed at a level above said inlet rolls and having an inlet opening for admission of items to be grilled into the inlet section of said passage, and means for adjusting the effective width of said inlet opening in sychronism with adjustment of the width of said passsage.

11. The grill of claim 9, further comprising a housing for said rolls and a handle for actuating said moving means and for maintaining said one inlet roll in a selected position, said handle being accessible at the exterior of said housing.

12. The grill of claim 11, wherein said housing has an inlet opening at a level above the inlet section of said passage and further comprising means actuatable by said handle to adjust the width of said opening.

13. The grill of claim 11, wherein said moving means further comprises a nut secured to one of said first and second bearing frames and a feed screw which is rotatable by said handle, which is rotatably mounted in said housing and which meshes with said nut to pivot said first bearing frame relative to the respective additional bearing frame when said handle is manipulated to rotate said feed screw, and further comprising means for coupling said first and second bearing frames to each other so that the other of said first and second bearing frames shares all pivotal movements of said one bearing frame in response to rotation of said feed screw.

* * * * *

UNITED STATES PATENT AND TRADEMARK OFFICE
CERTIFICATE OF CORRECTION

PATENT NO. : 4,574,771
DATED : March 11, 1986
INVENTOR(S) : Peter GUTEKUNST

It is certified that error appears in the above-identified patent and that said Letters Patent are hereby corrected as shown below:

[73] Assignee: "Köchengeräte" should read --Küchengeräte--.
Col. 4, line 49, "frist" should read --first--.
Col. 4, line 68, after "one" insert --inlet--.

Signed and Sealed this

Nineteenth Day of August 1986

[SEAL]

Attest:

DONALD J. QUIGG

Attesting Officer

Commissioner of Patents and Trademarks